(12) United States Patent
Naïbo et al.

(10) Patent No.: US 7,716,234 B2
(45) Date of Patent: May 11, 2010

(54) APPARATUS AND METHOD FOR QUERYING DATABASES VIA A WEB SERVICE

(75) Inventors: Alexis-Jean Laurent Naïbo, Levallois-Perret (FR); Didier Marc Jean Bolf, Boulogne-Billancourt (FR); Philippe Meiniel, Maule (FR); Richard Thomas Reynolds, Jr., Pleasanton, CA (US)

(73) Assignee: Business Objects, S.A., Levallois-Perret (FR)

( * ) Notice: Subject to any disclaimer, the term of this patent is extended or adjusted under 35 U.S.C. 154(b) by 307 days.

(21) Appl. No.: 11/752,803

(22) Filed: May 23, 2007

(65) Prior Publication Data
US 2007/0276815 A1    Nov. 29, 2007

Related U.S. Application Data

(60) Provisional application No. 60/808,860, filed on May 26, 2006.

(51) Int. Cl.
*G06F 17/30* (2006.01)

(52) U.S. Cl. .................................................... 707/760
(58) Field of Classification Search ..................... 707/4, 707/101, 102, 104.1
See application file for complete search history.

(56) References Cited

U.S. PATENT DOCUMENTS

| 5,555,403 A | 9/1996 | Cambot et al. |
| 7,222,121 B2 * | 5/2007 | Casati et al. ................. 707/100 |
| 7,478,419 B2 * | 1/2009 | Anderson et al. ............... 726/1 |
| 2003/0163450 A1 * | 8/2003 | Borenstein et al. ............. 707/1 |
| 2007/0106664 A1 * | 5/2007 | Huang et al. ................... 707/6 |

* cited by examiner

*Primary Examiner*—Leslie Wong
(74) *Attorney, Agent, or Firm*—Colley Godward Kronish LLP

(57) ABSTRACT

A computer readable storage medium includes executable instructions to receive an input message specifying a query identifier and query parameters. A query definition specified by the query identifier is retrieved. The query parameters are mapped in accordance with the query definition to form a query. The query is passed to a semantic layer with semantically dynamic objects. Query results are received from the semantic layer. The query results are mapped to a specified web service interface to form an output message.

19 Claims, 13 Drawing Sheets

| Publish Query As A Web Services Wizard | ☒ |
|---|---|
| 1. Description | Businsess Objects |

Web Service Name

MyServiceName

Web Service Description:

This is a Web Services exposing Revenue and Margin by State, City, Store and Product Line filter by year.

[Cancel]   [<Back]  [Next>]

*FIG. 9*

| Publish Query As A Web Services Wizard | | |
|---|---|---|
| 2. Select a Universe | | Businsess Objects |

| Universe name | Description |
|---|---|
| eFashion | eFashion retail Data Warehouse Created 14 Oct 1998, up... |
| eFashion | eFashion retail Data Warehouse Created 14 Oct 1998, up... |
| Island Restorts Marketing | Universe for the Marketing department. Updated 3 April 2... |
| Provisional_Revenues | La.. |
| PSFT General Ledger | AP · Br · AR · PC · PO  Part |
| Solution Selling | Created by Ahmed Mekhane (10/8/2001) |
| TestMobi | |
| TestMobi | |

Cancel        <Back   Next>

*FIG. 10*

Publish Query As A Web Services Wizard

3. Query

Result Objects — 1102

| Year | Quarter | Service Line | Revenue |

Filter Objects — 1104

Country Equal to ▼ | Which Country |

- Island Resorts Marketing
  - Resort
    - Country
    - Resort
    - Service Line
    - Service
    - Bahamas resort
    - Hawaiian resort
  - Sales
    - Sales Person
    - Year
    - Quarter
    - Month
    - Week
    - Invoice Date
    - Year 1998
    - Year 1999
    - Year 2000
  - Customer
    - Sponsor
    - Country of origin
    - Region Cancel    <Back    Next>

Publish Query As A Web Services Wizard ☒

Universe name: Island Resorts Marketing    4. Preview

Business Objects

Web Service In
⊟ ··· Input Parameters
     ······ Which_Country_

Web Service Out
⊟ ··· Output Parameters
     ······ Year
     ······ Quarter
     ······ Service_Line
     ······ Revenue

| Year | Quarter | Service Line | Revenue |
|---|---|---|---|
| FY1998 | Q1 | Accommodati | 51390 |
| FY1998 | Q1 | Food & D | 10290 |
| FY1998 | Q1 | Recreation | 14590 |
| FY1998 | Q2 | Accommodati | 59160 |
| FY1998 | Q2 | Food & D | 11110 |
| FY1998 | Q2 | Recreation | 15290 |
| FY1998 | Q3 | Accommodati | 53850 |
| FY1998 | Q3 | Food & D | 10545 |
| FY1998 | Q3 | Recreation | 16690 |
| FY1998 | Q4 | Accommodati | 35220 |
| FY1998 | Q4 | Food & D | 7825 |
| FY1998 | Q4 | Recreation | 9980 |

Cancel                    <Back    Publish

*FIG. 13*

Query As A Web Services Wizard

Query As A Web Services Catalog
NewWebServices
HTTPS
RichardR
CityMeasures
CityDetail
MonthlyMeasureDetail
SKUDetail
SalesbyLine
SalesbyCategory
LinesLOV
CategoryLOV
SKULOV
ColorLOV
MyWebService
Store_Qty_LOV
Year_Qtr_Qty
MyDemoService
MyQueryID Name: MyQueryID Description: Description of MyQueryID Web Services Universe Name: Island Resorts Marketing WSDL URL: http://2as3rx100/dswsbobje/MyQueryID.wsd New | Edit | Delete Close

*FIG. 14*

APPARATUS AND METHOD FOR QUERYING DATABASES VIA A WEB SERVICE

CROSS REFERENCE TO RELATED APPLICATION

This application claims the benefit U.S. Provisional Patent Application 60/808,860, filed May 26, 2006, entitled "Apparatus and Method for Querying Databases Via a Web Service", the contents of which are incorporated herein by reference.

BRIEF DESCRIPTION OF THE INVENTION

This invention relates generally to database access techniques. More particularly, this invention relates to a web service based technique for querying databases.

BACKGROUND OF THE INVENTION

Business Objects of San Jose, Calif. has developed a widely deployed relational database access system that uses semantically dynamic objects. The technology is known as the Business Objects semantic layer. The technology is described in U.S. Pat. No. 5,555,403, which is incorporated herein by reference. The Business Objects semantic layer obviates the need for a user to master the various subtleties of existing query languages when writing database queries.

A web service is a software system designed to support interoperable machine-to-machine interaction over a network. A web service has an interface that is specified in a format such as the Web Service Description Language (WSDL). Other systems interact with the web service in a manner prescribed by the interface using messages, which may be enclosed in a container, such as Simple Object Access Protocol (SOAP), which is a protocol for exchanging eXtensible Markup Language (XML) messages over a computer network. SOAP forms the foundation layer of the web service stack, providing a basic messaging framework that more abstract layers can build on.

Web service messages are typically conveyed using the Hyper Text Transport Protocol (HTTP) and normally comprise XML in conjunction with other Web-related standards. Software applications written in various programming languages and running on various platforms can use web services to exchange data over computer networks, such as the Internet.

It would be desirable to expand access to database semantic layers through web services.

SUMMARY OF THE INVENTION

The invention includes a computer readable storage medium with executable instructions to receive an input message specifying a query identifier and query parameters. A query definition specified by the query identifier is retrieved. The query parameters are mapped in accordance with the query definition to form a query. The query is passed to a semantic layer with semantically dynamic objects. Query results are received from the semantic layer. The query results are mapped to a specified web service interface to form an output message.

The invention also includes a computer readable storage medium with executable instructions to specify a web service query and associate semantically dynamic objects with the web service query. A web service interface is built for the web service query, which specifies a query method, a query identifier, a query input definition and a query output definition.

BRIEF DESCRIPTION OF THE FIGURES

The invention is more fully appreciated in connection with the following detailed description taken in conjunction with the accompanying drawings, in which:

FIGS. 5-14 illustrate Graphical User Interfaces (GUIs) that may be utilized to implement operations of the invention.

Like reference numerals refer to corresponding parts throughout the several views of the drawings.

DETAILED DESCRIPTION OF THE INVENTION

The invention includes a tool, which is termed "Query as a Web Service" (hereinafter QaaWS), which allows users to create Web Services based on semantic layer universes associated with a data source. These Web Services can be used by other users as input to their applications. QaaWS is based on standard W3C specifications such as SOAP, WSDL and XML.

Figure 1A:
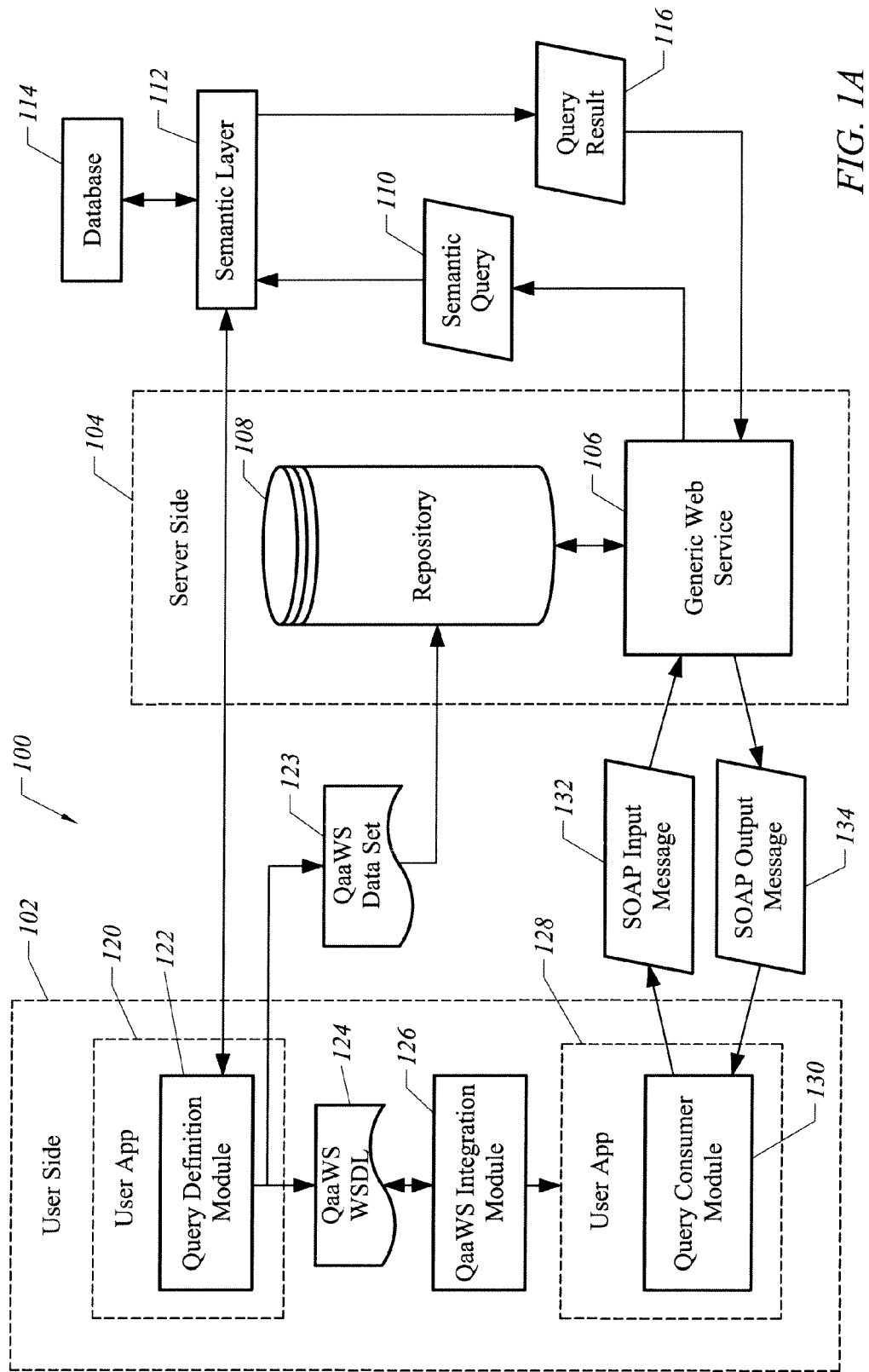
FIG. 1a illustrates a system configured in accordance with an embodiment of the invention.
Figure 1B:
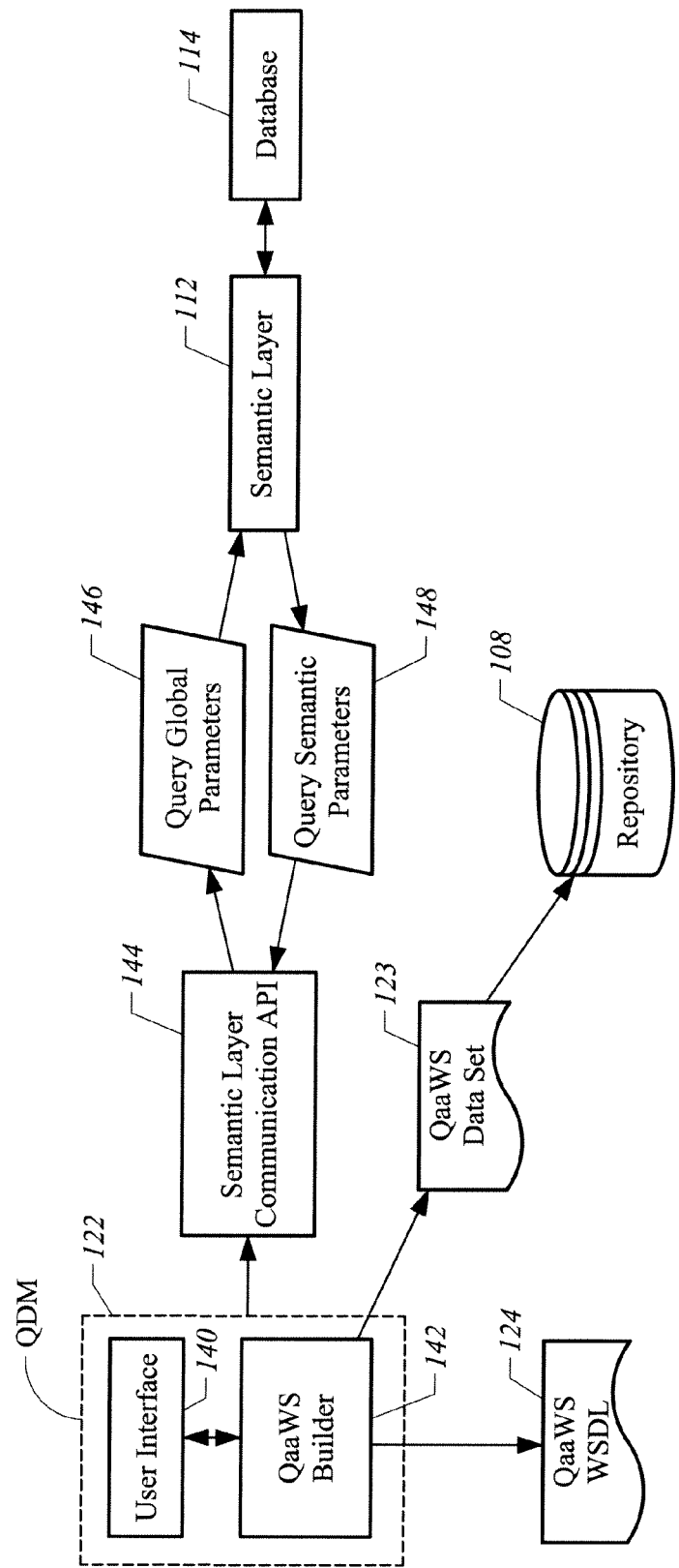
FIG. 1b is a more detailed view of components of FIG. 1.
Figure 1C:
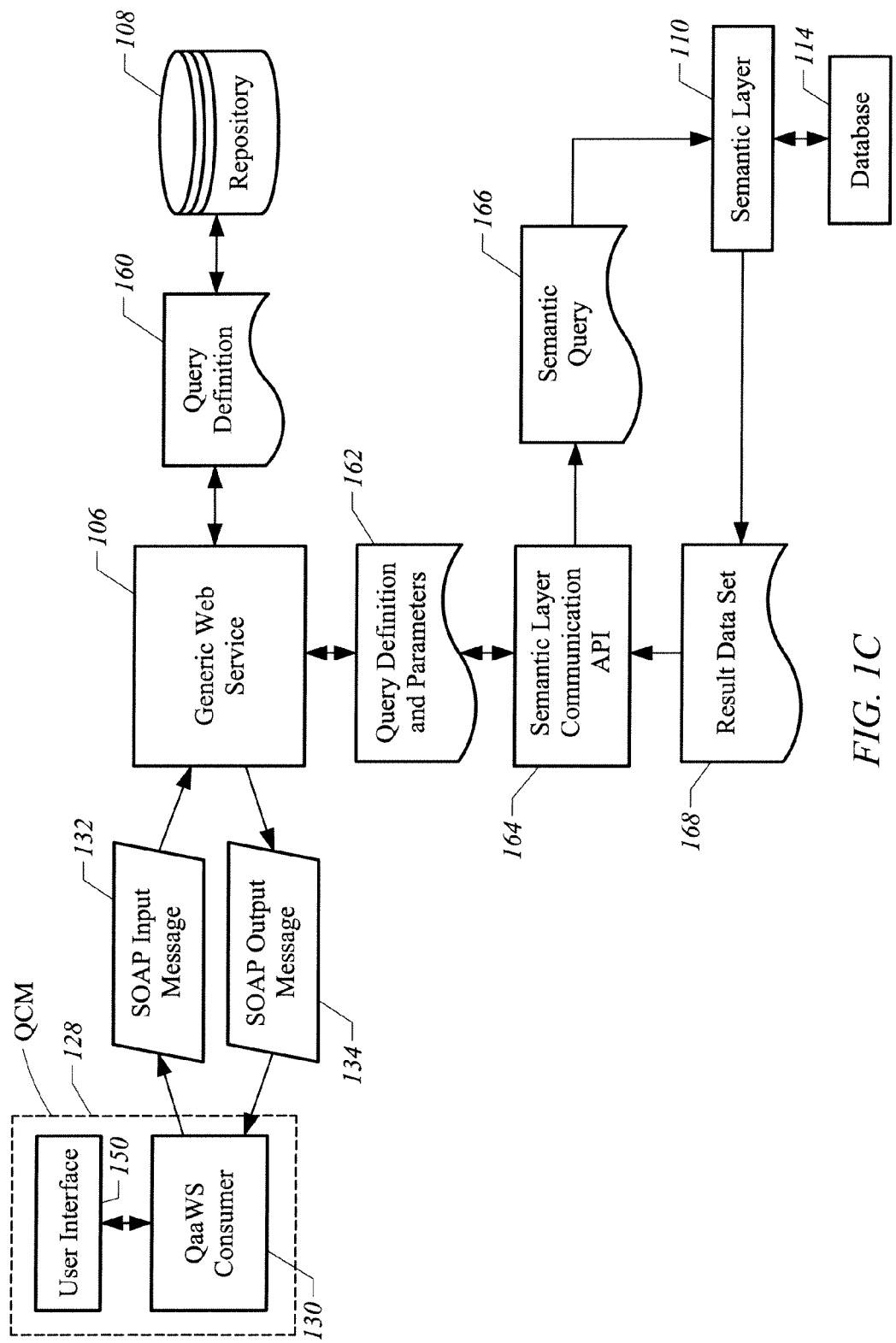
FIG. 1c is a more detailed view of components of FIG. 1.

FIG. 1 illustrates a system 100 configured in accordance with an embodiment of the invention. The system 100 includes a client or user side 102 and a server side 104. The server side 104 includes a generic web service 106, which accesses a repository 108. The web service 106 also communicates with a semantic query module 110, which accesses a semantic layer 112. The semantic layer 112 subsequently applies a query to the database 114. The semantic layer 112 transports the query result 116 back to the web service 106.

On the user side 102, a user application 120 includes a query definition module 122. In one embodiment, the query definition module 122 is configured to directly access the semantic layer 112 in a conventional manner. In accordance with an embodiment of the invention, the query definition module 122 is also configured to generate Query as a Web Service (QaaWS) content in accordance with a web service description language (WSDL) 124. The content is applied to a QaaWS integration module 126. A QaaWS data set 123 is also applied to a repository 108. A QaaWS integration module 126 receives the QaaWS WSDL content 124 and communicates with a user application 128, which includes a query consumer module 130, which generates a SOAP input message 132, which is applied to the web service 106.

FIG. 1A illustrates that the query definition module 122 may be implemented with a user interface 140 and a QaaWS builder module 142 to build the QaaWS data set 123 and QaaWS WSDL 124. In one embodiment, the query definition module 122 accesses a semantic layer communication application program interface (API) 144, which generates global parameter queries 146, which are applied to the semantic layer 112 and ultimately the database 114. This processing produces query semantic parameters 148.

Each QaaWS data set has a query identifier and a QaaWS definition from which a QaaWS WSDL file may be inferred.

The QaaWS WSDL file (QWF) is a general definition of the elements to be considered for building an application which will consume the QaaWS at the user side.

The QaaWS WSDL file 124 comprises a query method, a query identifier, a query input/output definition, and SOAP methods, which correspond to the ports and methods for connection to the web service.

In order to create a QaaWS, the Query Definition User Interface 140 first connects to the Semantic Layer 112 to get the universe list as well as business objects associated with the database 114. The user may then make on-screen selections of database elements and filters in order to describe the intended query in the form of a query specification.

The QaaWS Builder sends the query specification to the Semantic Layer 112 by means of a Semantic Layer Communication API 144. The Semantic Layer 112 resolves the query semantic parameters (QSP) for defining the query definition stored in the QaaWS Data Set 123. The QaaWS Builder 142 further generates the QaaWS WSDL file 124 from the query definition, as well as the query identifier in order to complete the QaaWS Data Set 123.

The QaaWS WSDL file 124 may be stored within the QaaWS Data Set 123 within the repository 108, or it may be stored elsewhere on the user side. Either way, the QaaWS WSDL file 124 may be accessed by a QaaWS Integration Module 126 on the user side, for implementing the QaaWS in a user application as a Query Consumer Module 130.

The Query Consumer Module 130 communicates with a Generic Web Service 106 on the server side by means of SOAP input messages 132 formatted according to the QaaWS WSDL file 124. The Generic Web Service 106 insures the communication with the Semantic Layer 110 for the processing of a Semantic Query (SQ), which returns a Query Result 116.

As shown on FIG. 1b, upon reception of a SOAP input message 132, the Generic Web Service 106 accesses the QaaWS Definition 160 in the Query Data Set (QDS) within the Repository 108 by means of the query identifier contained in the SOAP input message.

The Generic Web Service 106 then maps the query parameters (within the SOAP input message) to the QaaWS Definition and parameters 162 in a Semantic Layer Communication API 164, which submits the Semantic Query 166 to the Semantic Layer 110.

In one embodiment, the Semantic Layer Communication API 164 is implemented as a Report Engine software developer kit (SDK), which selectively submits the QaaWS Definition to the Semantic Layer 110.

As such, the Semantic Query may not be directly processed by the Semantic Layer, which returns a message to the Report Engine SDK asking for the missing prompt parameters. The Report Engine SDK maps the query parameters in the Semantic Query, which is processed by the Semantic Layer 110. This implementation of the Semantic Layer Communication API constitutes a Query Resolution Function, which is further discussed in connection with FIG. 4. However, the Semantic Layer Communication API 164 could be implemented differently, by mapping the query parameters to the QaaWS definition 162 prior to sending the Semantic Query 166, so that it may be processed directly by the Semantic Layer 110.

The Semantic Layer Communication API 164 receives a Result Data Set 168, which is transmitted to the Generic Web Service 106 in the form of an Output Data Set formatted according to the QaaWS WSDL file.

The Generic Web Service 106 then transmits the Output Data Set to the Query Consumer Module 130 by means of a SOAP output message 134. The Query Result (QR) is then accessible to an interface at the user side, which may be a user, or another application.

The "Query as a Web Service" includes at least two components:
- A client component, where users may create and publish QaaWS. The client component may be installed on several machines that can access and share the same Query as a Web Service catalog stored on the server.
- A server component that stores the Query as a Web Service catalog and hosts the published Web Services. The client component communicates with the server components via Web Services.

Three procedures may be used to create and publish a Query as a Web Service:
1. Login to the application (FIG. 2),
2. Create the query (FIG. 3),
3. Publish the query (FIG. 3)

Figure 2:
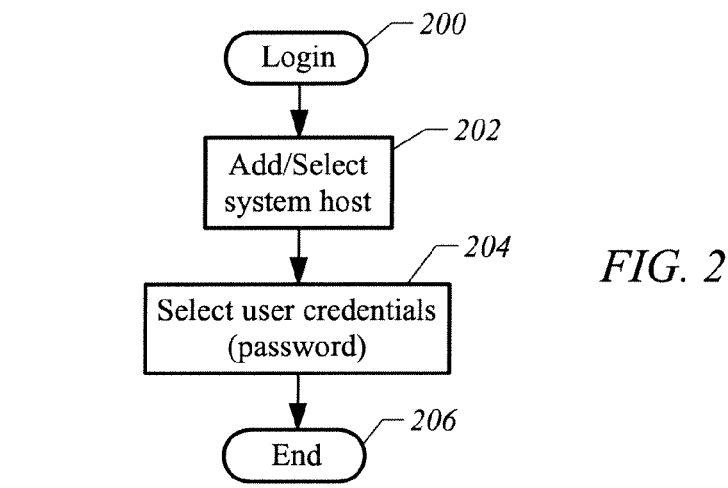
FIG. 2 illustrates login operations that may be utilized in accordance with an embodiment of the invention.
Figure 5:
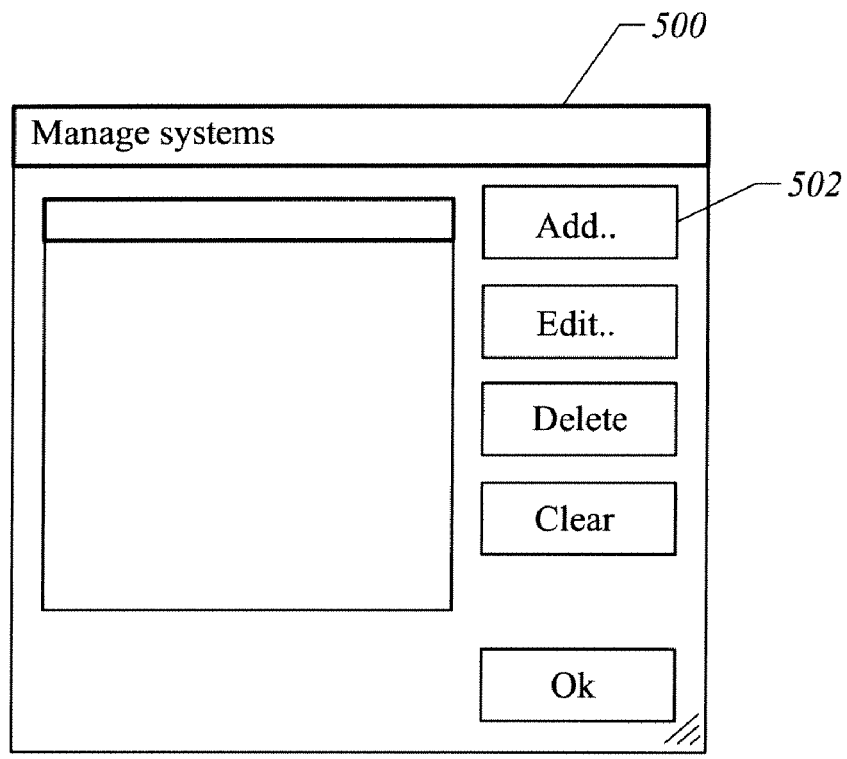
Figure 6:
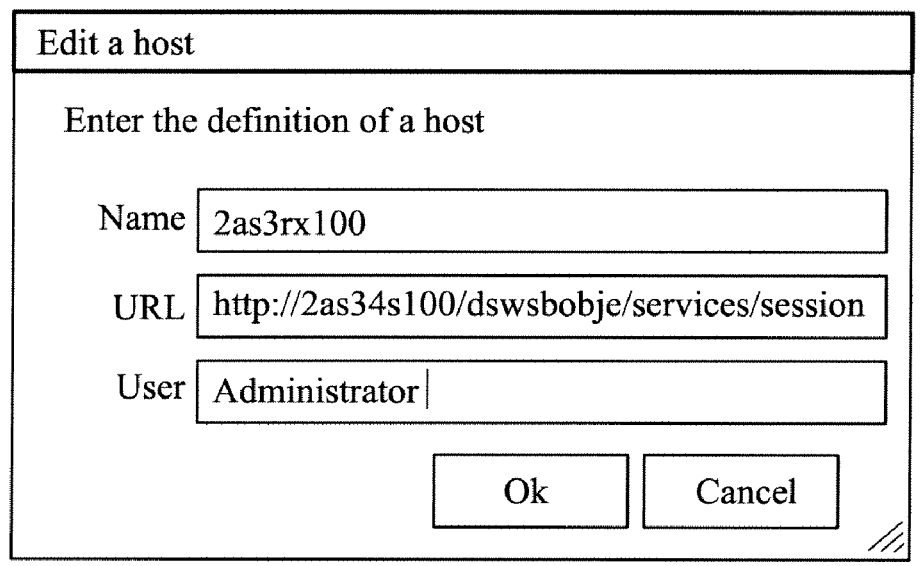
Figure 7:
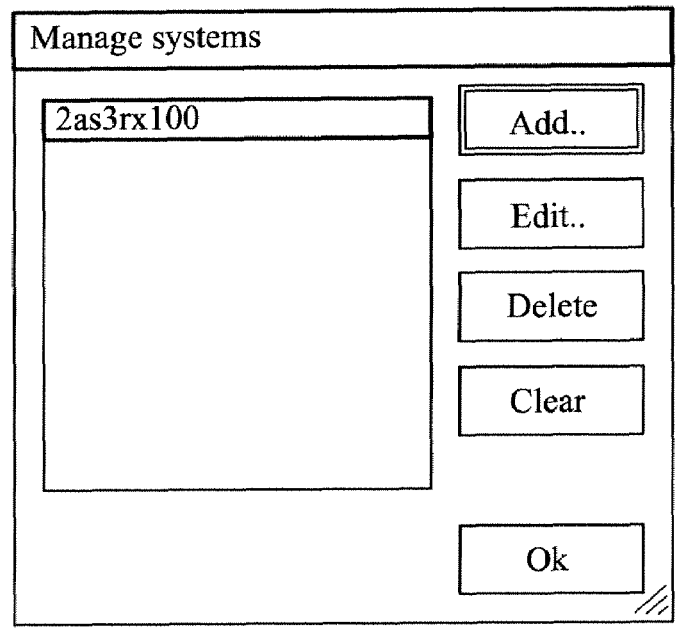

With reference to FIG. 2, logging into the application 200 includes defining a system host from a pre-existing list or by adding a new host 202. FIG. 5 illustrates a GUI 500 that may be used to add a new host, by selecting button 502. The system host may be defined through a service URL, as shown in FIG. 6. The service URL should be associated with a correct port identifier. Then, the list of system hosts is updated, as shown in FIG. 7.

Figure 8:
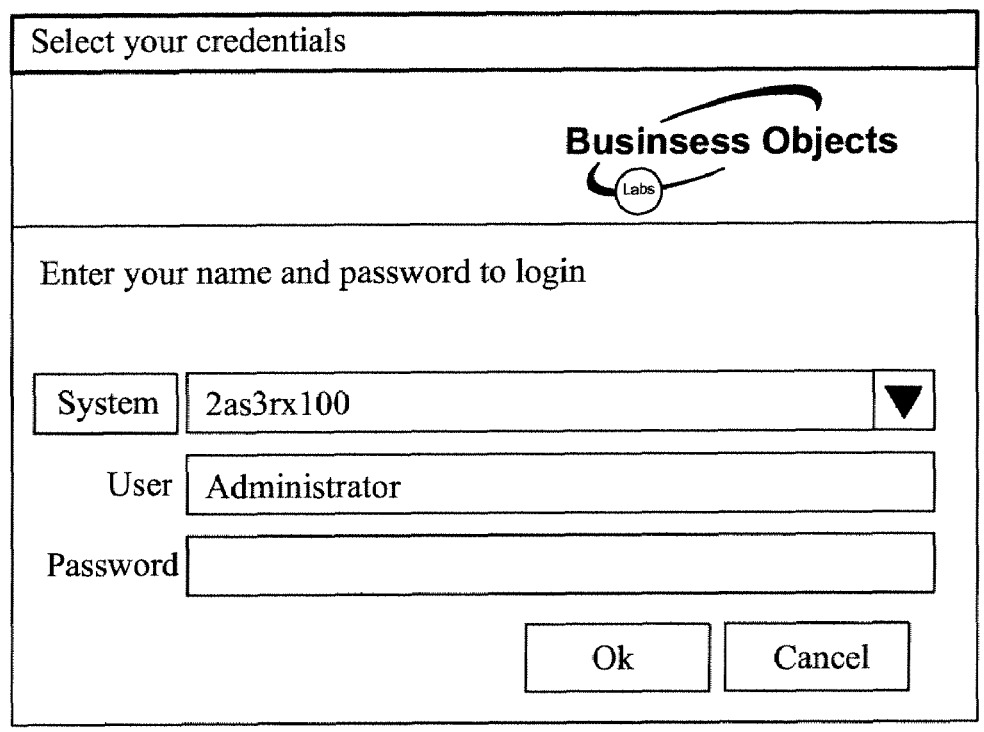

Returning to FIG. 2, user credentials are then selected 204. A credentials dialog box, such as shown in FIG. 8, may thereafter be used for password checking, if appropriate. This completes the login process 206.

Figure 3:
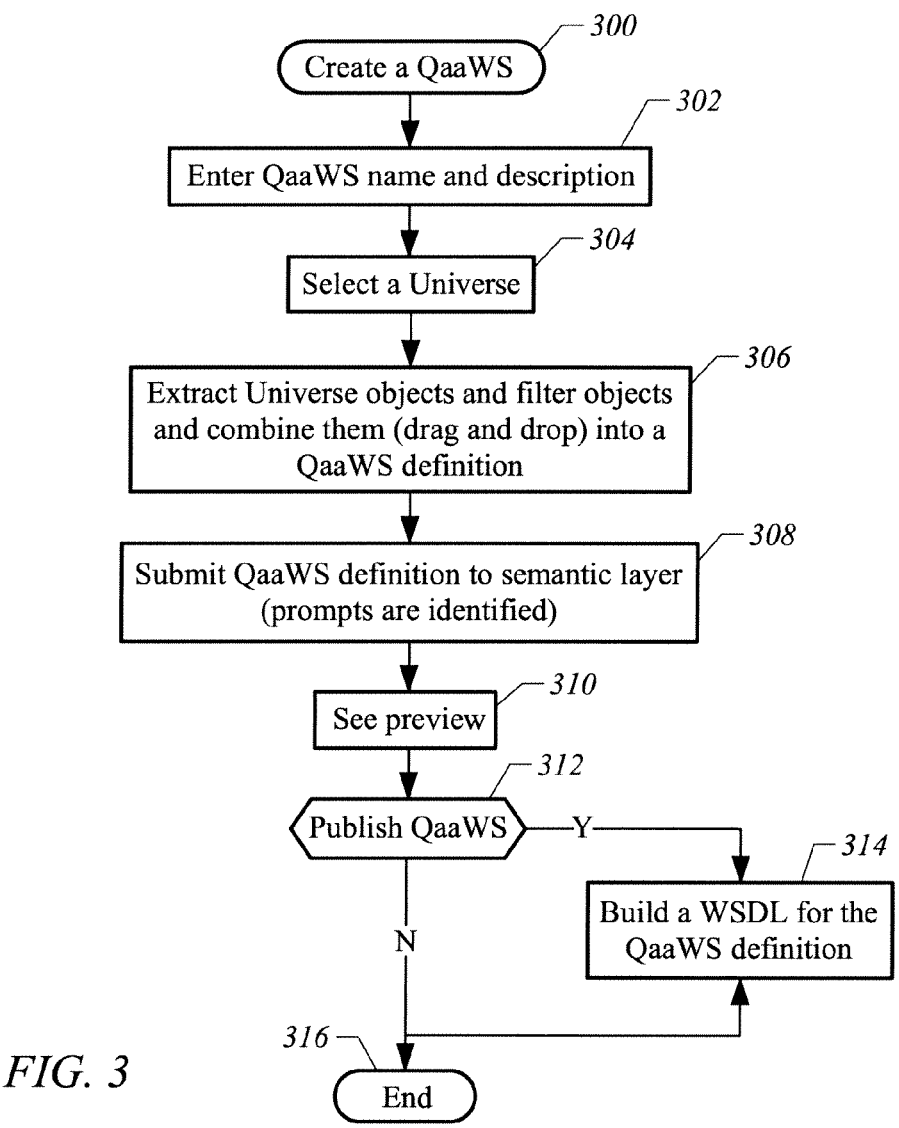
FIG. 3 illustrates Query as a Web Service (QaaWS) processing performed in accordance with an embodiment of the invention.

FIG. 3 illustrates the creation of a QaaWS 300. The operator may then be supplied a field to enter a name for the Query as a Web Service 302. The GUI of FIG. 9 may be used to implement this operation. Character restrictions may apply. The Web Service Description box permits to enter text in natural language that will help operators to reuse the query. Next, a list of system universes may be supplied. FIG. 10 illustrates a GUI to implement this operation. The operator selects a universe 304.

A query panel may then appear. FIG. 11 illustrates a Business Objects Query Panel to implement this operation. The operator may drag and drop objects from the left pane 1100 into the Result Objects pane 1102 and the Filter Objects pane 1104 to create a query, which corresponds to block 306 of FIG. 3.

In the filter objects pane, the filter may be selected either as a "Condition" or as a "Prompt". A condition is an expression based on operators and constants. A prompt is an expression using a variable, which the user will define later, e.g. at runtime.

Figure 12:
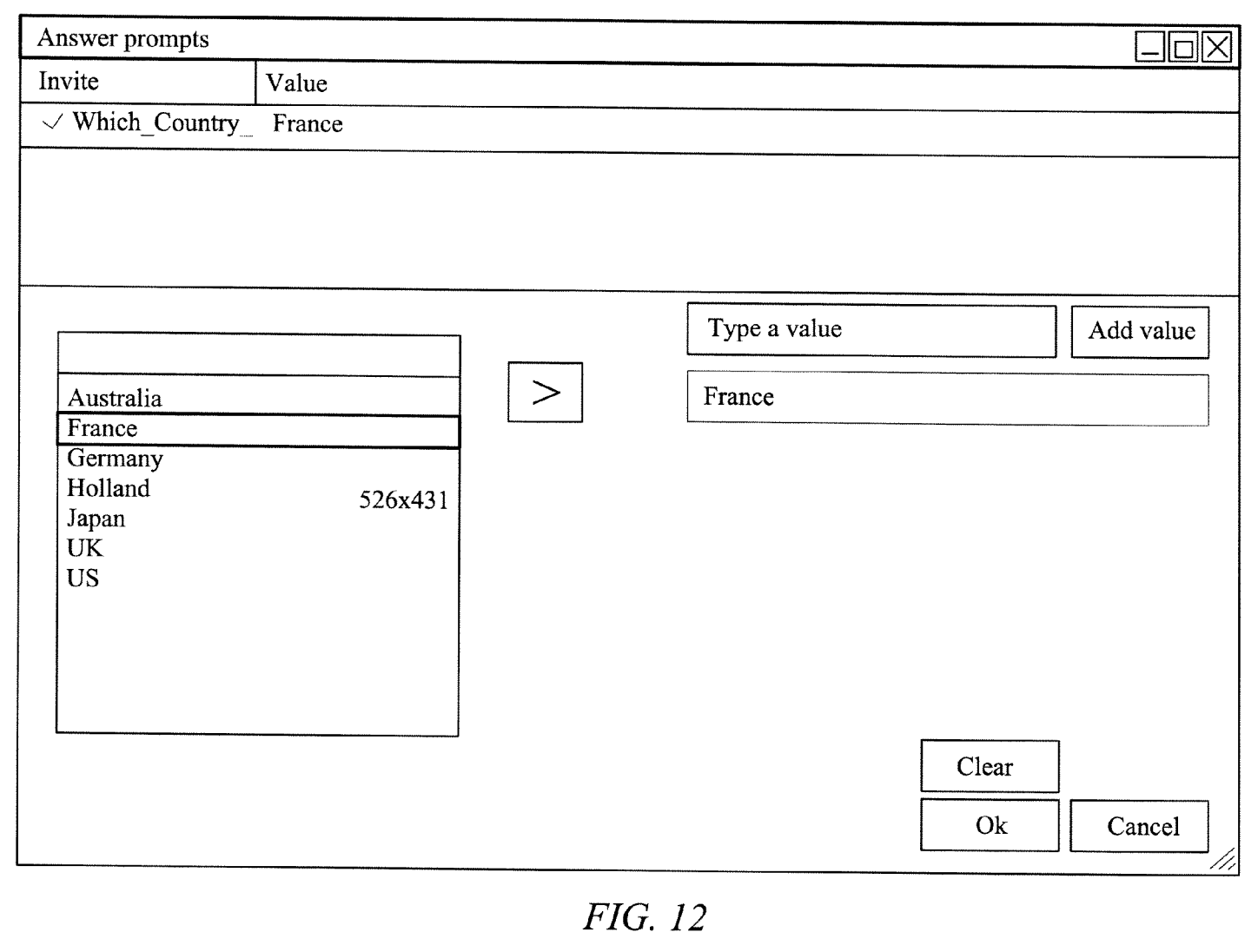

FIG. 12 illustrates an Answer prompts dialog box. This dialog box allows one to select prompts to redefine. The modified values may be confirmed by clicking the OK button. FIG. 13 illustrates a sample of the values the Web Services will send back.

This results in metadata forming a QaaWS definition, which is submitted to a semantic layer, which is operation 308 of FIG. 3. The semantic layer checks that the metadata defines a valid query and identifies the prompts existing therein.

As also shown in FIG. 13, a preview of the Query as a Web Service may appear, which corresponds to block 310 of FIG. 3. In one embodiment, the preview includes a Sample of data plus the Web Services input and output parameters:
- the Web Services Input Parameters represent the input parameters of the created Web Services. The input parameters are linked to the query panel prompts.

the Web Services Output Parameters represent the output parameters of the created Web Services. The output parameters are linked to Result Objects the operator has put in the query panel and they are expressed as a result set.

Clicking the "Publish" button within FIG. 13 results in the publishing of the QaaWS, which corresponds to block 312 of FIG. 3. A WSDL for the QaaWS definition is then built 312. The creation of the Query as a Web Service is now completed 316. It is stored on the Server and may now be used to create reports.

In short, metadata is created, which corresponds to the operator's selections in the query panel of FIG. 11. Basically, the metadata is configured to be directly understood by the semantic layer. The semantic layer responds by:

identifying the variables or "prompts" in the query Input Parameters, returning the types of the query Output Parameters.

In the case of a variable or prompt, a portion of XML language is established.

This may be viewed as modeling the query. The model corresponds to a mapping of the query as entered into suitable query data for the semantic layer. A query comprises result objects and a logical tree of conditions. For example, the result object may be Year, Quarter, Product Line, Revenue and the logical tree of conditions may be (Country=<<France>>).

The Prompt( ) function corresponds to prompting the user to define a value (or more) for a variable. Upon usage of the query, the operator will have to define value(s) for that variable ("resolve that variable") before the query results can be obtained.

The invention includes modelling input parameter definitions. The correspondence between the query and the input parameters may be mapped as follows:

1—Each prompt is mapped to an XSD element. An XSD is an XML schema instance.

2—The cardinality of that XSD element is calculated using the <<prompt>> properties. If the prompt accepts one or more values the cardinality will be <<unbounded>>. By contrast, if the prompt accepts a single value only the cardinality will be 1.

3—The name of the XSD element corresponds to the name of the prompt to be encoded, substituting reserved characters with '' (underscore), as appropriate.

4—The XSD type of the XSD element corresponds to the type of the prompt, as returned by the semantic layer. In the example (B.O. Semantic Layer), the current type may be Numeric, AlphaNumeric and Date, which will be mapped to XSD type string, double or data time.

5—The XML namespace corresponds to the unique ID of the Web Service under creation.

Output parameter definitions may also be modelled. The correspondence between the query and the output parameters is mapped as follows 1—Each output object is mapped to an XSD element having a given cardinality.

2—The name of the element corresponds to the name of the output object to be encoded, substituting reserved characters with (underscore), as appropriate.

3—The XSD type of the XSD element corresponds to the type of the output object, as returned by the semantic layer. In the example (B.O. semantic layer), the type may be Numeric, AlphaNumeric and Date, which will be mapped to XSD type string, double or data time.

4—The AML namespace corresponds to the unique ID of the Web Service under creation.

The Web Service may be "consumed", i.e., used in an application program that is WSDL aware. This may be done simply by copying the URL and pasting it in the application.

Figure 4:
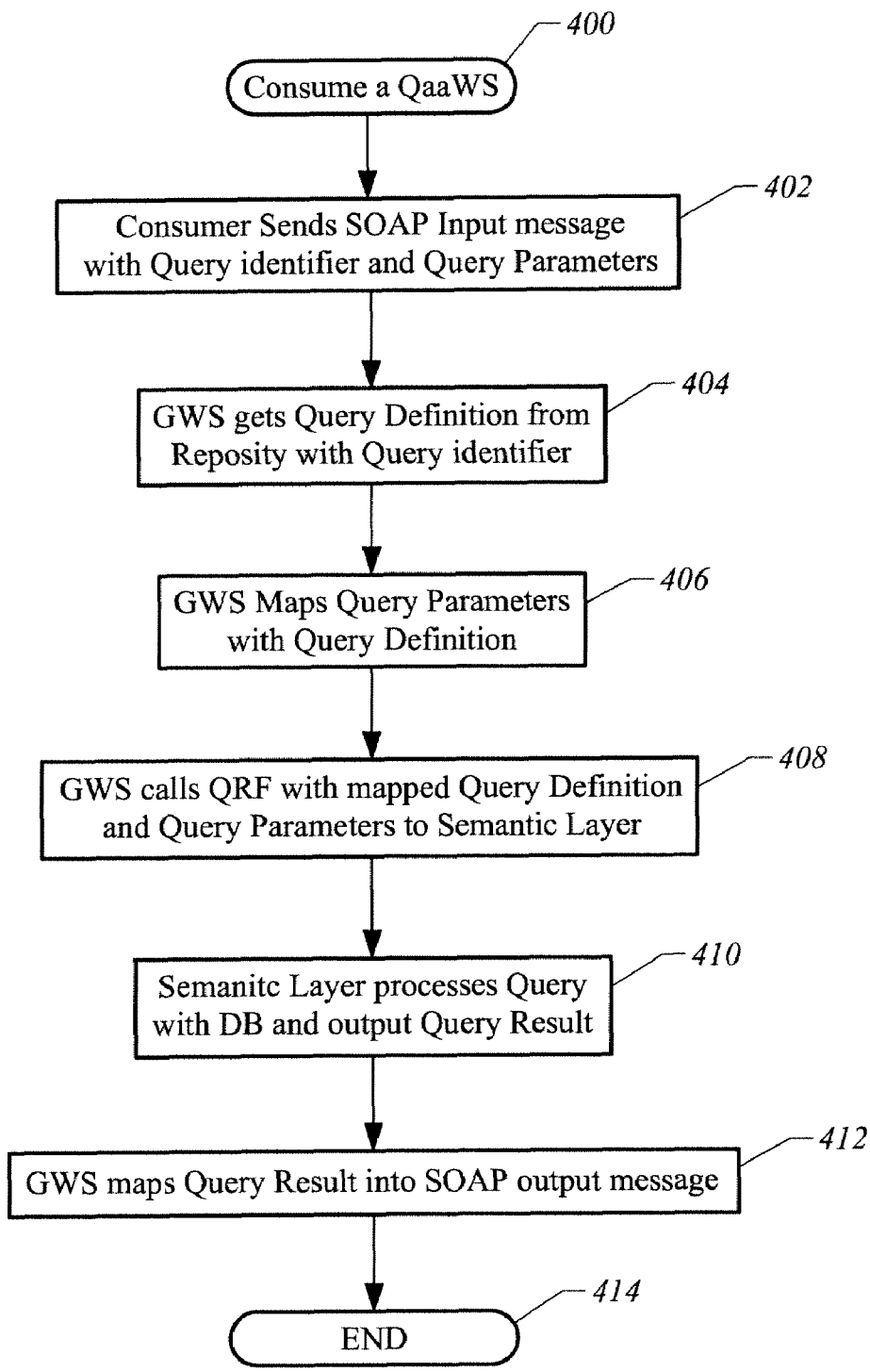
FIG. 4 illustrates QaaWS consumption processing performed in accordance with an embodiment of the invention.

FIG. 4 illustrates an initial operation of consuming a QaaWS 400. These operations include:

the Consumer Sends a SOAP Input message with Query identifier and Query Parameters 402;

the Generic Web Service or GWS gets the Query Definition from Repository R, according to the Query identifier of the QaaWS 404;

the Generic Web Service or GWS maps the parameters of the Query, using the Query Definition 406;

the Generic Web Service or GWS calls the Query Resolution Function (QRF) with mapped Query Definition and Query Parameters to Semantic Layer 408;

the Semantic Layer processes the Query with the database DB and outputs corresponding Query Results 410;

the Generic Web Service or GWS maps the Query Results into an XML format defined by the WSDL for the results and then returns it to the Consumer as a SOAP output message 412. This forms the end 414.

On the user side, the designer may manage the created QaaWS. When launching the Query as a Web Service, the Query Catalogue List appears in the left pane. This includes all the queries the operator has created. Queries as a Web Service may be managed from the Query Catalogue list by performing one or more of the following actions:

Viewing Query as a Web Service properties,

Modifying a Query as a Web Service, and

Deleting a Query as a Web Service.

Later, the properties of a Query as a Web Service may be viewed by clicking on that Query as a Web Service in the Query as a Web Services Catalog, as shown in FIG. 14. By clicking the WSDL URL, one opens the WSDL in Internet Explorer. More precisely, to view the properties of a Query as a Web Service, click on the name of the Query. Its properties appear in the right pane.

To modify a Query as a Web Service

1. In the Query Catalog, click on the Query as a Web Service Name

2. Click the Edit button

The Query as a Web Service appears in the wizard where it may be modified in substantially the same manner as described above (Creating, Previewing and Publishing a Query as a Web Service).

To delete a Query as a Web Service

1. In the Query Catalog, click on the Query as a Web Service name.

2. Click Delete.

The invention is implemented in software code accessible on any appropriate computer-readable medium. The expression "computer-readable medium" includes a storage medium such as magnetic or optic. Embodiments of the invention include:

the software code for creating and publishing a QaaWS;

the software code for consuming a QaaWS, and the software code for the Generic Web Server and the Semantic Layer APIs.

Exhibit 1 contains exemplary WSDL methods and corresponding code and query definitions according to an embodiment of the invention, as well as exemplary SOAP input and output messages.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

Exhibit 1

| | |
|---|---|
| E1.1 | queryasaservice (wsdl) |
| | runQueryAsAService |
| E1.2 | `<?xml version="1.0" encoding="UTF-8"?>` |
| | `<!--` |
| | Copyright (c) 2006 Business Objects |
| | `-->` |
| E1.3 | `<definitions` |
| | `xmlns:http="http://schemas.xmlsoap.org/wsdl/http/"` |
| | `xmlns:soap="http://schemas.xmlsoap.org/wsdl/soap/"` |
| | `xmlns:s="http://www.w3.org/2001/XMLSchema"` |
| | `xmlns:s0="MyQueryID" xmlns:tnsl="dsws.businessobjects.com"` |
| | `targetNamespace="MyQueryID"` |
| | `xmlns="http://schemas.xmlsoap.org/wsdl/"` |
| | `name="queryasaservice">` |
| E1.4 | `<!-- ---------->` |
| | `<!-- QueryAsAServiceType -->` |
| | `<!-- ---------->` |
| | `<types>` |
| | `<s:schema elementFormDefault="qualified"` |
| | `targetNamespace="MyQueryID">` |
| | `<s:element name="runQueryAsAService">` |
| | `    <s:complexType>` |
| | `        <s:sequence>` |
| | `            <s:element name="login" type="s:string"/>` |
| | `            <s:element name="password"` |
| | `type="s:string"/>` |
| E1.4a | `            <s:element name="Which_Country_"` |
| | `type="s:string" />` |
| | `        </s:sequence>` |
| | `    </s:complexType>` |
| | `</s:element>` |
| E1.5 | `<s:complexType name="Row">` |
| | `    <s:sequence>` |
| | `        <s:element name="Year" type="s:string"/>` |
| | `        <s:element name="Quarter"` |
| | `type="s:string"/>` |
| | `        <s:element name="Service_Line"` |
| | `type="s:string"/>` |
| | `        <s:element name="Revenue"` |
| | `type="s:double"/>` |
| | `    </s:sequence>` |
| | `</s:complexType>` |
| | `<s:complexType name="Table">` |
| | `    <s:sequence>` |
| | `        <s:element name="row" minOccurs="0"` |
| | `maxOccurs="unbounded" type="s0:Row"/>` |
| | `    </s:sequence>` |
| | `</s:complexType>` |
| E1.5a | `<s:element name="runQueryAsAServiceResponse">` |
| | `    <s:complexType>` |
| | `        <s:sequence>` |
| | `            <s:element name="message"` |

-continued

Exhibit 1

```
                    type="s:string"/>
                        <s:element name="creatorname"
                    type="s:string"/>
                        <s:element name="creationdate"
                    type="s:dateTime"/>
                        <s:element name="creationdateformated"
                    type="s:string"/>
                        <s:element name="description"
                    type="s:string"/>
                        <s:element name="universe"
                    type="s:string"/>
                        <s:element name="queryruntime"
                    type="s:long"/>
                        <s:element name="fetchedrows"
                    type="s:long"/>
                        <s:element name="numberofexecution"
                    type="s:long"/>
                        <s:element name="maxfetchedrows"
                    type="s:long"/>
                        <s:element name="avgqueryruntime"
                    type="s:long"/>
                        <s:element name="avgfetchedrows"
                    type="s:long"/>
                        <s:element name="table" type="s0:Table"/>
                    </s:sequence>
                </s:complexType>
            </s:element>
        </s:schema>
    </types>
```
E1.6
```
    <!-- ------------>
    <!-- Operations messages -->
    <!-- ------------>
    <message name="runQueryAsAServiceSoapIn">
        <part name="parameters"
    element="s0:runQueryAsAService"/>
    </message>
    <message name="runQueryAsAServiceSoapOut">
        <part name="parameters"
    element="s0:runQueryAsAServiceResponse"/>
    </message>
```
E1.7
```
    <!-- ------------>
    <!-- port Type messages -->
    <!-- ------------>
    <portType name="QueryAsAServiceSoap">
        <operation name="runQueryAsAService">
            <documentation>Get Web Service Provider server
    info</documentation>
            <input message="s0:runQueryAsAServiceSoapIn"/>
            <output message="s0:runQueryAsAServiceSoapOut"/>
        </operation>
    </portType>
```
E1.8
```
    <!-- ------------>
    <!-- Binding -->
    <!-- ------------>
    <binding name= "QueryAsAServiceSoap"
    type="s0:QueryAsAServiceSoap">
        <soap:binding
    transport="http://schemas.xmlsoap.org/soap/http"
    style="document"/>
        <operation name="runQueryAsAService">
            <soap:operation
    soapAction="MyQueryID/runQueryAsAService" style="document"/>
            <input>
                <soap:body use="literal"/>
            </input>
            <output>
                <soap:body use="literal"/>
            </output>
        </operation>
    </binding>
```
E1.9
```
    <!-- ------------>
    <!-- Service -->
    <!-- ------------>
    <service name="MyQueryID">
        <documentation>Description of MyQueryID Web
    Services</documentation>
        <port name="QueryAsAServiceSoap"
```

-continued

Exhibit 1

|  |  |
|---|---|
|  | binding="s0:QueryAsAServiceSoap"><br><soap:address<br>location="http://2as3rx100:9080/dswsbobje/services/queryasas ervice"/><br></port><br></service><br></definitions> |
| E2.1 | <?xml version="1.0" encoding="ISO-8859-1" ?><br>– <QueryList><br>– <QueryWS><br><ServiceName>MyQueryID</ServiceName><br><QueryServiceName>MyQueryID</QueryServiceName><br><OutputGenerateMode>2</OutputGenerateMode><br><CreatorName>Administrator</CreatorName><br><CreationDate>1147807193250</CreationDate><br><Description>Descirption of MyQueryID Web Services</Description><br><UniverseID>UnivCUID=AcWR_AmyPJtKpaAvWXV7vA0</UniverseID><br><UniverseName>Island Resorts Marketing</UniverseName> |
| E2.2 | <QuerySpec><br><QuerySpecification<br>xmlns:xsd="http://www.w3.org/2001/XMLSchema"<br>xmlns:xsi="http://www.w3.org/2001/XMLSchema-instance"><br><QueryBase xsi:type="Query"<br>xmlns="http://query.businessobjects.com/2005"><br><QueryResult Key="UnivCUID=AcWR_AmyPJtKpaAvWXV7vA0.DO18"><br><Name>Year</Name> </QueryResult><br><QueryResult Key="UnivCUID=AcWR_AmyPJtKpaAvWXV7vA0.DO1a"><br><Name>Quarter</Name> </QueryResult><br><QueryResult Key="UnivCUID=AcWR_AmyPJtKpaAvWXV7vA0.DO4"><br><Name>Service Line</Name> </QueryResult><br><QueryResult Key="UnivCUID=AcWR_AmyPJtKpaAvWXV7vA0.DO7"><br><Name>Revenue</Name> </QueryResult><br><QueryCondition QueryConditionOperator="And"> <Item xsi:type="Filter" FilterOperator="Equal"><br><FilteredObject Key="UnivCUID=AcWR_AmyPJtKpaAvWXV7vA0.DO6"><br><Name>Country</Name> </FilteredObject><br><Operand xsi:type="Prompt" KeepLastValues="false" Constrained="false" HasLov="true" Order="0"><br><Question>Which_Country_</Question> </Operand> </Item><br></QueryCondition><br></QueryBase><br></QuerySpecification><br></QuerySpec> |
| E2.3 | <WSDLUrl>http://2as3rx100:9080/dswsbobje/MyQueryID.wsdl</WSDLUrl><br><AvgRunningTime>1453</AvgRunningTime><br><AvgFetchedRows>72</AvgFetchedRows><br><MaxFetchedRows>36</MaxFetchedRows><br><nbExecution>2</nbExecution><br><InputParams ID="ROOT.0" Name="Which_Country_" PromptType="Mono" Type="String" /><br><OutputParams ID="Year" Name="Year" Type="String" /><br><OutputParams ID="Quarter" Name="Quarter" Type="String" /><br><OutputParams ID="Service_Line" Name="Service_Line" Type="String" /><br><OutputParams ID="Revenue" Name="Revenue" Type="Numeric"/><br></QueryWS><br><endlist /><br></QueryList> |
| E3 | <?xml version="1.0" encoding="utf-8"?><soap:Envelope<br>xmlns:soap="http://schemas.xmlsoap.org/soap/envelope/"<br>xmlns:xsi="http://www.w3.org/2001/XMLSchema-instance"<br>xmlns:xsd="http://www.w3.org/2001/XMLSchema"><br><soap:Body><br><runQueryAsAService xmlns="MyQueryID"><br><login>Administrator</login><br><password /><br><Which_Country_>US</Which_Country_><br></runQueryAsAService><br></soap:Body><br></soap:Envelope> |
| E4 | <?xml version="1.0" encoding="UTF-8"?><br><soapenv:Envelope<br>xmlns:soapenv="http://schemas.xmlsoap.org/soap/envelope/"<br>xmlns:xsd="http://www.w3.org/2001/XMLSchema"<br>xmlns:xsi="http://www.w3.org/2001/XMLSchema-instance"> |

-continued

Exhibit 1

```
<soapenv:Body>
    <runQueryAsAServiceResponse xmlns="MyQueryID">
        <message/>
        <creatornameAdministrator</creatorname>
        <creationdate>2006-05 16T12:19:53.250Z</creationdate>
        <creationdateformated>05/16/2006 0:19:53 PM
</creationdateformated>
        <description>Descirption of MyQueryID Web
Services</description>
        <universe>Island Resorts Marketing</universe>
        <queryruntime>641</queryruntime>
        <fetchedrows>36</fetchedrows>
        <numberofexecution>2</numberofexecution>
        <maxfetchedrows>36</maxfetchedrows>
        <avgqueryruntime>726</avgqueryruntime>
        <avgfetchedrows>36</avgfetchedrows>
        <table>
            <row>
                <Year>FY1998</Year>
                <Quarter>Q1</Quarter>
                <Service_Line>Accommodation</Service_Line>
                <Revenue>127455</Revenue>
            </row>
            <row>
                <Year>FY1998</Year>
                <Quarter>Q1</Quarter>
                <Service_Line>Food
&Drinks</Service_Line>
                <Revenue>24935</Revenue>
            </row>
            <row>
                <Year>FY1998</Year>
                <Quarter>Q1</Quarter>
                <Service_Line>Recreation</Service_Line>
                <Revenue>28200</Revenue>
            </row>
            (...)
        </table>
</runQueryAsAServiceResponse>
</soapenv:Body>
</soapenv:Envelope>
```

The invention claims is:

1. A computer readable storage medium, comprising executable instructions to:
   receive a set of semantic layer objects that define a semantic layer query to a database;
   receive a web service input message specifying a query identifier and query parameters;
   retrieve a query definition specified by the query identifier;
   map the query parameters in accordance with the query definition to the semantic layer query;
   pass the semantic layer query to a semantic layer with semantically dynamic objects operating as an interface to the database;
   receive database results from the semantic layer; and
   map the database results to a specified web service interface to form a web service output message.

2. The computer readable storage medium of claim 1 wherein the web service input message is a Simple Object Access Protocol (SOAP) message.

3. The computer readable storage medium of claim 1 wherein the executable instructions to map the query parameters include executable instructions to map the query parameters to query prompts for the semantic layer.

4. The computer readable storage medium of claim 1 wherein the executable instructions to map the query parameters include executable instructions to call a query resolution function.

5. The computer readable storage medium of claim 4 wherein the query resolution function is a report engine software developer kit.

6. The computer readable storage medium of claim 1 wherein the executable instructions to map the query parameters include executable instructions to invoke a semantic layer communication application program interface.

7. The computer readable storage medium of claim 1 wherein the executable instructions to map the query results include executable instructions to map the query results into a web service interface with an eXtensible Markup Language (XML) format defined by a Web Service Description Language.

8. The computer readable storage medium of claim 7 wherein the executable instructions to map the query results include executable instructions to form a Simple Object Access Protocol (SOAP) output message.

9. A computer readable storage medium, comprising executable instructions to:
   specify a web service query;
   route the web service query to a semantic layer supporting semantically dynamic objects; and
   build a web service interface for the web service query specifying a query method, a query identifier, a query input definition and a query output definition;
   map the query identifier and query input definition to a semantic layer query;

pass the semantic layer query to the semantic layer supporting semantically dynamic objects operating as an interface to a database;

receive database results from the semantic layer; and map the database results to the query output definition of the web service interface.

10. The computer readable storage medium of claim 9 further comprising executable instructions to invoke the semantic layer via a semantic layer communication application program interface.

11. The computer readable storage medium of claim 10 further comprising executable instructions to receive global parameter queries from the semantic layer communication application program interface.

12. The computer readable storage medium of claim 9 wherein the web service interface is a web service description language file.

13. The computer readable storage medium of claim 12 wherein the web service description language file is invoked to form an input message.

14. The computer readable storage medium of claim 12 wherein the web service description language file is invoked to form a Simple Object Access Protocol (SOAP) input message.

15. The computer readable storage medium of claim 9 wherein the web service description language file is invoked to process an output message.

16. The computer readable storage medium of claim 9 wherein the web service description language file is invoked to process a Simple Object Access Protocol (SOAP) output message.

17. The computer readable storage medium of claim 12 wherein the web service description language file forms a portion of a web service data set.

18. The computer readable storage medium of claim 17 wherein the web service data set is stored in a repository accessible by a web service.

19. The computer readable storage medium of claim 9 further comprising executable instructions to send query global parameters to the semantic layer and receive query semantic parameters from the semantic layer.

* * * * *